US012665827B2

(12) United States Patent
Dirksen et al.

(10) Patent No.: US 12,665,827 B2
(45) Date of Patent: Jun. 23, 2026

(54) CONTINUOUS CELL SITE STATUS MONITORING

(71) Applicant: T-Mobile Innovations LLC, Overland Park, KS (US)

(72) Inventors: Jamir A. Dirksen, Casselberry, FL (US); Ivan Maldonado, Apopka, FL (US); Christopher C. Poirier, Titusville, FL (US); Roger Wilbert, Oviedo, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/919,371

(22) Filed: Oct. 17, 2024

(65) Prior Publication Data
US 2026/0113257 A1 Apr. 23, 2026

(51) Int. Cl.
*H04L 43/0817* (2022.01)
*H04L 41/22* (2022.01)

(52) U.S. Cl.
CPC .......... *H04L 43/0817* (2013.01); *H04L 41/22* (2013.01)

(58) Field of Classification Search
CPC ............................ H04L 43/0817; H04L 41/22
See application file for complete search history.

(56) References Cited

U.S. PATENT DOCUMENTS

| | | | | | |
|---|---|---|---|---|---|
| 6,289,010 | B1 * | 9/2001 | Voit | ..................... | H04Q 3/0045 |
| | | | | | 379/91.01 |
| 8,260,900 | B2 * | 9/2012 | Morrison | ............ | H04L 43/0817 |
| | | | | | 709/223 |
| 9,753,800 | B1 * | 9/2017 | Jadunandan | ........ | H04L 41/5074 |
| 10,447,807 | B1 * | 10/2019 | Earl | ...................... | G06F 11/076 |
| 11,388,068 | B1 * | 7/2022 | Balmakhtar | .......... | H04L 67/146 |
| 11,582,705 | B1 * | 2/2023 | Marupaduga | ......... | H04W 24/02 |
| 12,003,394 | B1 * | 6/2024 | Lewis | ................... | H04W 24/08 |
| 2006/0262011 | A1 * | 11/2006 | Bull | ...................... | G01S 5/0226 |
| | | | | | 342/357.29 |
| 2009/0252043 | A1 * | 10/2009 | Daniel | ................. | H04Q 3/0087 |
| | | | | | 709/224 |
| 2010/0228854 | A1 * | 9/2010 | Morrison | ................ | H04L 41/00 |
| | | | | | 715/764 |
| 2012/0064900 | A1 * | 3/2012 | Thadasina | ............. | H04W 48/20 |
| | | | | | 455/446 |
| 2017/0318477 | A1 * | 11/2017 | Priest | ..................... | H04N 7/185 |
| 2019/0095510 | A1 * | 3/2019 | Cruise | .............. | G06F 16/24568 |

(Continued)

*Primary Examiner* — Javier O Guzman

(57) ABSTRACT

A method. The method comprises periodically retrieving cell site information from operational support systems (OSSs) by an application executing on a computer system, where the cell site information is associated with cell sites sourced by different equipment vendors and associated with different cellular technologies; converting the cell site information received from the OSSs by the application into a uniform format; retrieving maintenance information about cell sites by the application; based on the maintenance information and based on the cell site information in uniform format, determining status of cells by the application; based on the status of cells and based on an inventory of cells disposed at different cell sites, determining a cell site availability for the cell sites by the application; and providing the status of cells and the cell site availability by the application to a network operation center (NOC) application executing on the computer system.

20 Claims, 7 Drawing Sheets

(56)　　　　References Cited

U.S. PATENT DOCUMENTS

| | | | |
|---|---|---|---|
| 2021/0022016 A1* | 1/2021 | Lee | H04W 24/04 |
| 2022/0116295 A1* | 4/2022 | Swinehart | H04L 43/0882 |
| 2023/0020832 A1* | 1/2023 | Hotchkiss | H04L 41/12 |
| 2024/0028370 A1* | 1/2024 | Lan | G06F 9/5077 |
| 2024/0348294 A1* | 10/2024 | Zhang | H04B 7/0413 |
| 2025/0132971 A1* | 4/2025 | Cuavas | H04L 41/0654 |

* cited by examiner

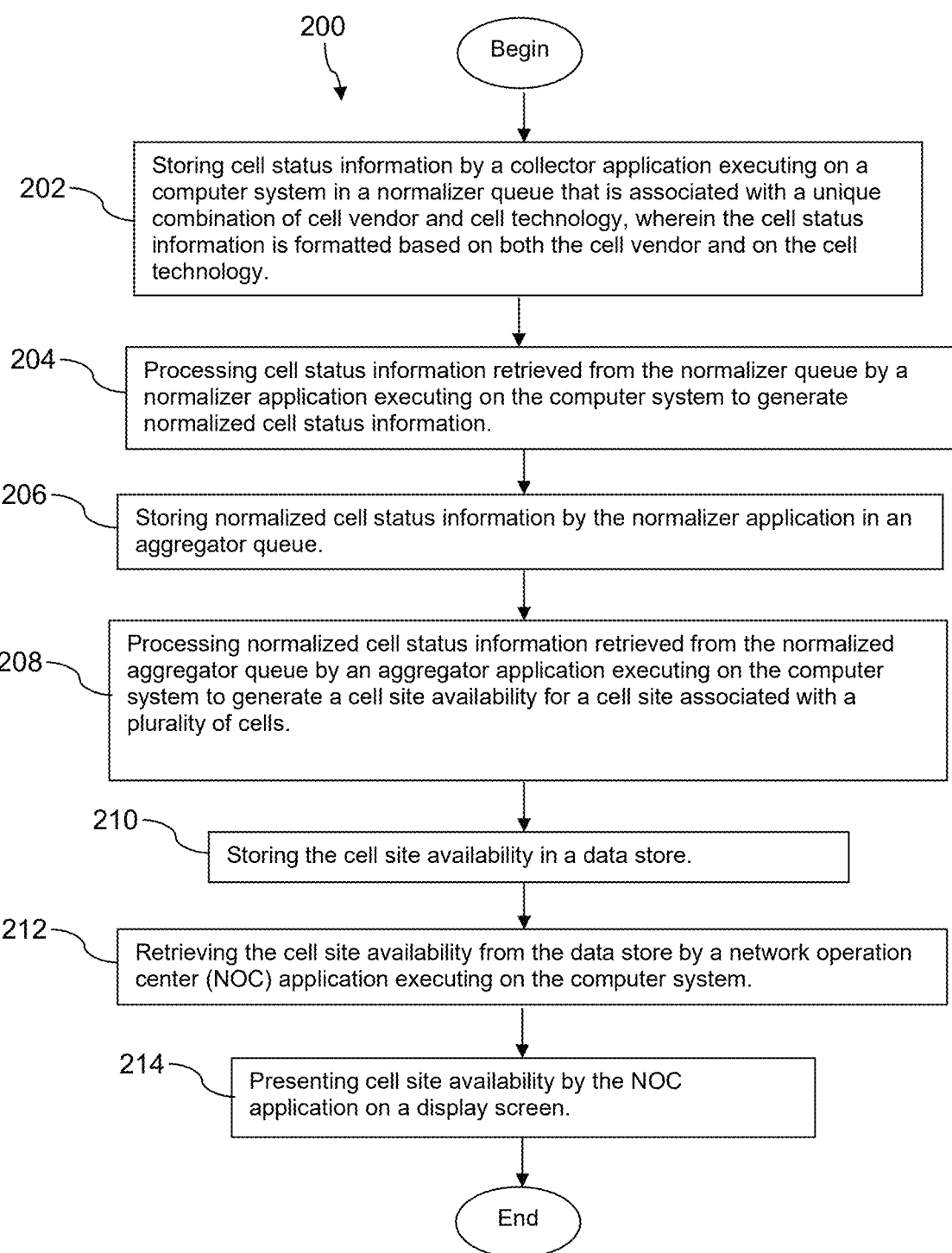

200

Begin

202 — Storing cell status information by a collector application executing on a computer system in a normalizer queue that is associated with a unique combination of cell vendor and cell technology, wherein the cell status information is formatted based on both the cell vendor and on the cell technology.

204 — Processing cell status information retrieved from the normalizer queue by a normalizer application executing on the computer system to generate normalized cell status information.

206 — Storing normalized cell status information by the normalizer application in an aggregator queue.

208 — Processing normalized cell status information retrieved from the normalized aggregator queue by an aggregator application executing on the computer system to generate a cell site availability for a cell site associated with a plurality of cells.

210 — Storing the cell site availability in a data store.

212 — Retrieving the cell site availability from the data store by a network operation center (NOC) application executing on the computer system.

214 — Presenting cell site availability by the NOC application on a display screen.

End

FIG. 3

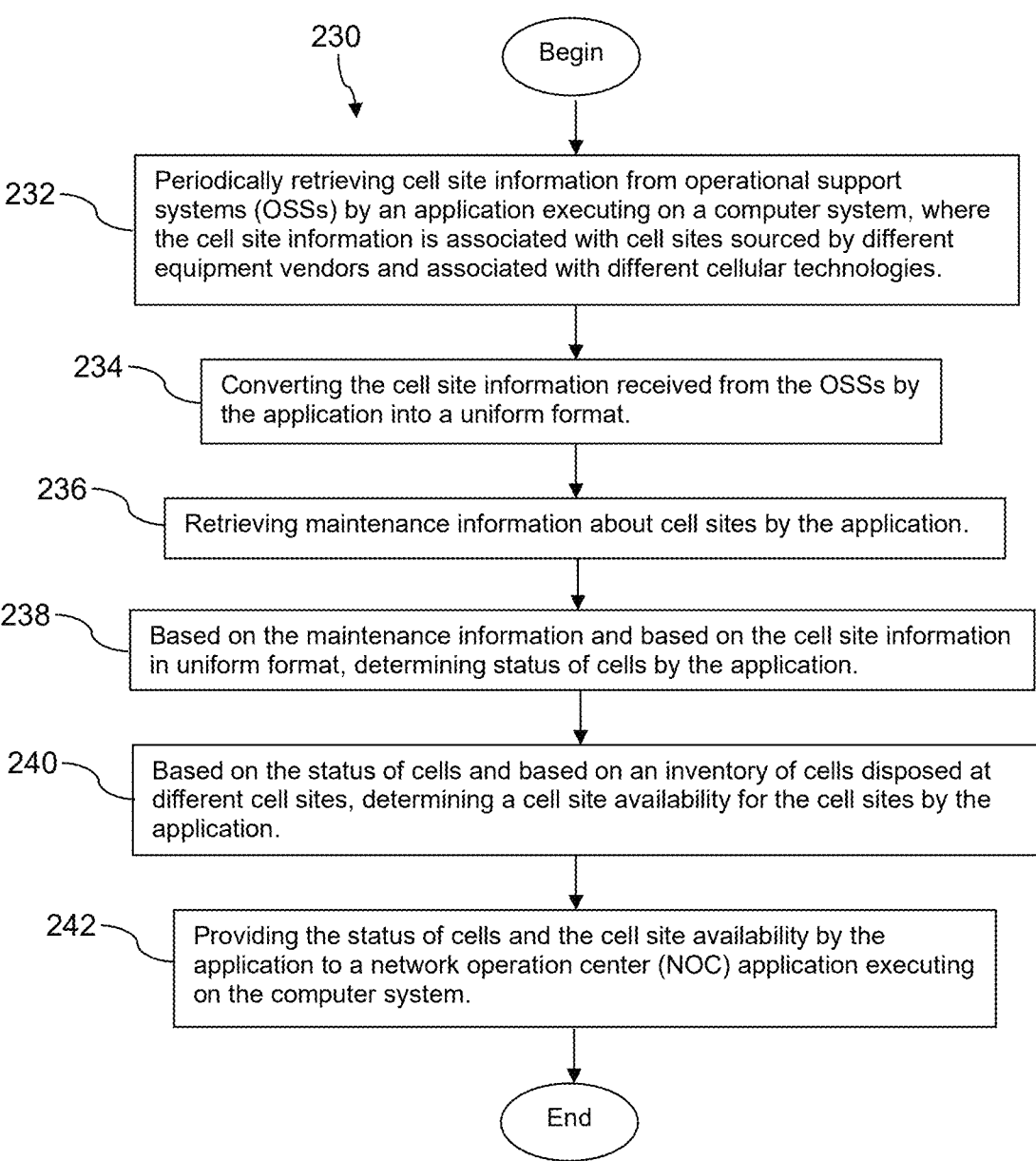

230

Begin

232 — Periodically retrieving cell site information from operational support systems (OSSs) by an application executing on a computer system, where the cell site information is associated with cell sites sourced by different equipment vendors and associated with different cellular technologies.

234 — Converting the cell site information received from the OSSs by the application into a uniform format.

236 — Retrieving maintenance information about cell sites by the application.

238 — Based on the maintenance information and based on the cell site information in uniform format, determining status of cells by the application.

240 — Based on the status of cells and based on an inventory of cells disposed at different cell sites, determining a cell site availability for the cell sites by the application.

242 — Providing the status of cells and the cell site availability by the application to a network operation center (NOC) application executing on the computer system.

End

5G NR Access Network 554a          554b          554c gNB          gNB          • • •          gNB

559

Application Server 558          5G Core Network

560

Network

CONTINUOUS CELL SITE STATUS MONITORING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NE) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a cell site status monitoring system is disclosed. The system comprises an at least one processor, a non-transitory memory, a plurality of cell status collector applications stored in the non-transitory memory, a plurality of normalizer applications stored in the non-transitory memory, wherein each normalizer application is associated with a unique combination of vendor and wireless technology, and an aggregator application stored in the non-transitory memory. When executed by the at least one processor, each cell status collector application obtains cell status information about cells associated with a unique combination of vendor and wireless technology and stores the obtained cell status information on a normalizer task queue associated with the unique combination of vendor and wireless technology that is associated to the cell status collector application. When executed by the at least one processor, each normalizer application retrieves cell status information from the normalizer task queue associated with the same unique combination of vendor and wireless technology that the normalize application is associated with, based on the retrieved cell status information, generates normalized cell status information in a normalized format, stores the normalized cell status information in a normalizer cache, stores changed normalized cell status information in a first data store in the non-transitory memory, and stores normalized cell status information on an aggregator task queue. When executed by the at least one processor, the aggregator application retrieves normalized cell status information from the aggregator task queue, processes the normalized cell status information to determine a cell site availability for each of a plurality of cell sites, wherein at least some of the plurality of cell sites comprise cells associated with different vendors and different technologies, stores the cell site availability for each of the plurality of cell sites in an aggregation cache in the non-transitory memory, and stores changed cell site availability in a second data store in the non-transitory memory.

In another embodiment, a method of monitoring cell site status is disclosed. The method comprises storing cell status information by a collector application executing on a computer system in a normalizer queue that is associated with a unique combination of cell vendor and cell technology, wherein the cell status information is formatted based on both the cell vendor and on the cell technology; processing cell status information retrieved from the normalizer queue by a normalizer application executing on the computer system to generate normalized cell status information; and storing normalized cell status information by the normalizer application in an aggregator queue. The method further comprises processing normalized cell status information retrieved from the normalizer queue by an aggregator application executing on the computer system to generate a cell site availability for a cell site associated with plurality of cells; storing the cell site availability in a data store; retrieving the cell site availability from the data store by a network operation center (NOC) application executing on the computer system; and presenting cell site availability by the NOC application on a display screen.

In yet another embodiment, a method is disclosed. The method comprises periodically retrieving cell site information from operational support systems (OSSs) by an application executing on a computer system, where the cell site information is associated with cell sites sourced by different equipment vendors and associated with different cellular technologies, converting the cell site information received from the OSSs by the application into a uniform format, and retrieving maintenance information about cell sites by the application. The method further comprises, based on the maintenance information and based on the cell site information in uniform format, determining status of cells by the application, based on the status of cells and based on an inventory of cells disposed at different cell sites, determining a cell site availability for the cell sites by the application, and providing the status of cells and the cell site availability by the application to a network operation center (NOC) application executing on the computer system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

FIG. 4 is a flow chart of another method according to an embodiment of the disclosure.

DETAILED DESCRIPTION

Figure 1:
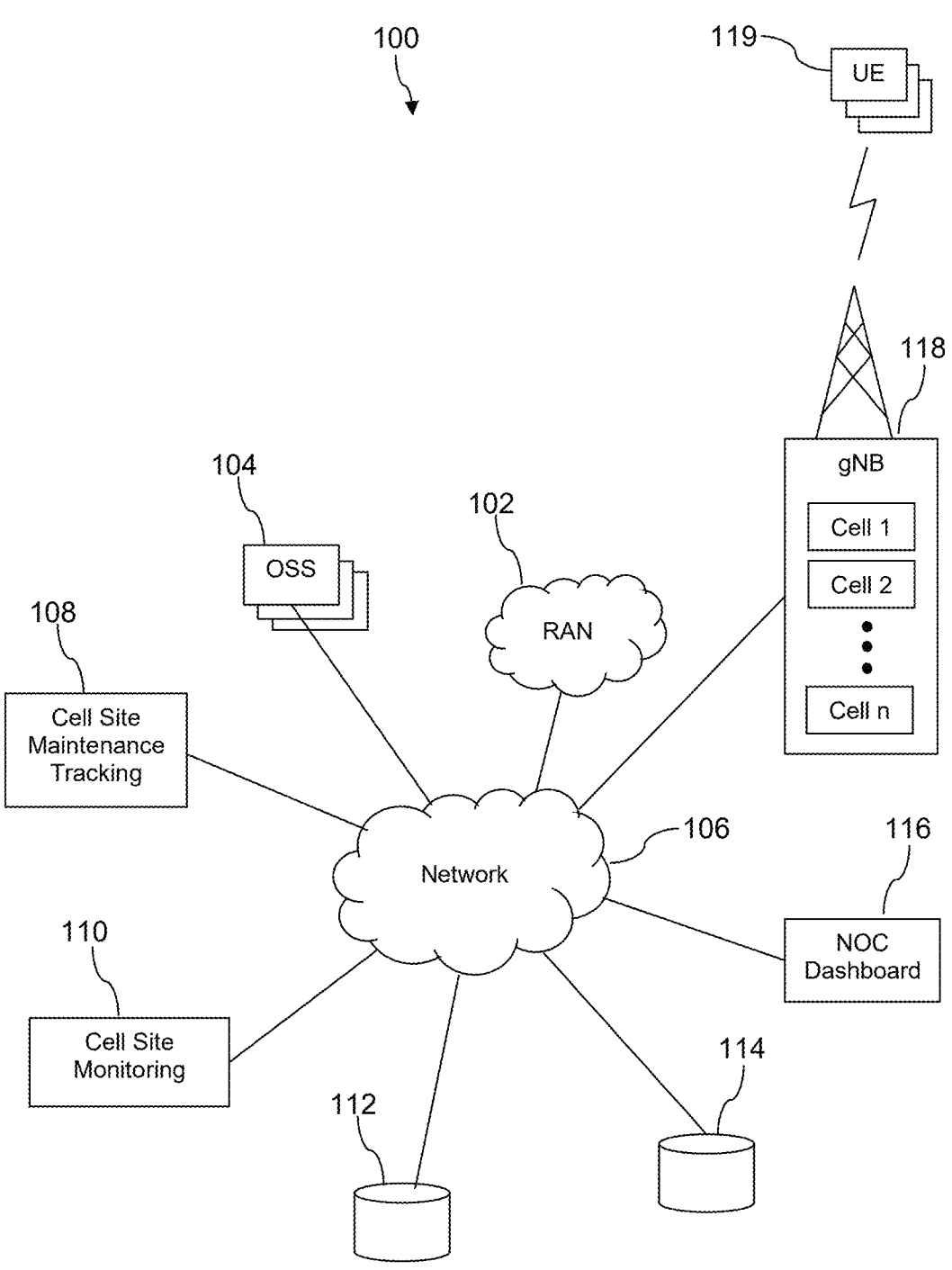
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for efficiently and timely flowing cell site status information up to a user visible level for monitoring and maintaining cell sites in a radio access network (RAN). In some systems there is a significant and undesirable time lag between the change of state of a cell site to this information being available to network operation center (NOC) technicians. On the other hand, it is possible to poll the cell sites continuously from a NOC, but this may suffer from the disadvantage of creating excessive network traffic and burdening the cell site equipment. By contrast, the present disclosure makes information on cell site status promptly accessible while avoiding excess network traffic.

In an embodiment, a plurality of operational support systems (OSSs) provide cell site status information. A plurality of collector applications or scripts may execute on a computer system to access the OSSs and collect cell site status information from the OSSs. Each cell site may comprise a plurality of separate cells. Some of the different cells at a cell site may be configured to support different cellular communication protocols or technologies. For example, a given cell site may comprise three different cells: two cells associated with a 5G cellular technology and one cell associated with a long-term evolution (LTE) technology. Cell sites are typically associated with a single cell site equipment vendor, but different cell sites may be associated with different equipment vendors. Each collector application may be configured to collect cell status information of a single technology type and associated with a single equipment vendor. For example, a first collector application may be associated with an LTE technology and a first equipment vendor; a second collector application may be associated with a 5G technology and the first equipment vendor; a third collector application may be associated with the LTE technology and a second equipment vendor; and a fourth collector application may be associated with the 5G technology and the second equipment vendor. One or more execution instances of each different collector application may be executed concurrently to support timely collection of data from the OSSs. The collector applications process cell status information into a parseable format and places the processed cell status information on different task queues—each different task queue associated with a different combination of cellular technology and equipment vendor. Each different combination of cellular technology and equipment vendor may format cell status information differently and the cell status information may contain different information.

A plurality of normalizer applications take cell status information off of the different task queues and process the cell status information to transform the cell status into a uniform or normalized format, to a common data structure.

The normalizer applications listen to the task queue they are associated to and are hence event driven (when a new cell status is placed on the task queue it associates to, the normalizer application is triggered to retrieve and process the new cell status). Each different normalizer application is configured to process cell status information associated with a specific combination of cellular technology and equipment vendor. For example, a first normalizer application is configured to process cell status information associated with the LTE technology and the first equipment vendor; a second normalizer application is configured to process cell status information associated with the 5G technology and the first equipment vendor; a third normalizer application is configured to process cell status information associated with the LTE technology and the second equipment vendor; and a fourth normalizer application is configured to process cell status information associated with the 5G technology and the second equipment vendor. While the discussion above has described four different combinations of technology and cell equipment vendor, it is understood that the teachings of the present disclosure could be advantageously applied to a RAN having more than two different cell technologies and/or having cell equipment sourced from more than two different equipment vendors.

The normalizers are configured to access a cell maintenance tracking tool to determine if cell sites are in a maintenance mode. For example, a cell may be deemed by the cell site maintenance tracking tool to be on air, retired, in maintenance, in a power saving mode, and in other maintenance states. The cell status information generated by the normalizers take into consideration the maintenance mode or maintenance states of the various cells. In an embodiment, the indication that a cell is in power saving mode may be provided by the OSSs. In an embodiment, the normalizers may ignore or disregard a cell status reported by an OSS when a cell is in a maintenance mode different from on-line status. In this case, the normalizer may inject a different status for the given cell site, such as available or another non-failed or non-down status.

The normalizer applications each establish a cache that stores the cell status information in normalized format. When cell status information has been changed, this change is written into a first data store of normalized cell status information. In an embodiment, the normalizers may periodically reload their caches from the first data store, whereby to assure consistency between their caches and the normalized data in the first data store. The normalizer applications also write normalized cell status information into a single normalized task queue. Thus, while in an embodiment there are four different types of normalizers (one normalizer type for each unique combination of technology and equipment vendor), there is only one normalized task queue.

An aggregator application takes cell status information off the normalized task queue for processing. The aggregator application analyzes cell status information to determine an aggregate availability of cell sites. For example, a cell site may comprise a plurality of separate cells. One cell at the cell site may be down but the cell site may continue to be partially available because one or two other cells at the same cell site may continue in service. Additionally, just because a cell is not actually ready to handle user traffic at a given moment in time does not mean that this decreases the availability of the given cell site. For example, the cell may be in a temporary low-power operation mode because user traffic is low and the cell site is conserving power: low-power operation mode of a cell would not count against the availability of the cell site. The aggregator stores cell site availability and cell site status information in a cache. The aggregator stores changes in cell site availability in a second data store. A NOC dashboard and other network management related applications may access both the first data store and the second data store to obtain cell status and cell site availability information whereby to manage and maintain the RAN. The pipeline of basic information and the transformation of this information, both to normalize and to take account of cell site maintenance states, can accelerate the propagation of cell site availability information to the NOC where this information can promote more rapid and timely monitoring and management of the RAN.

Turning now to FIG. 1, a system 100 is described. In an embodiment, the system 100 comprises a radio access network (RAN) 102, a plurality of operational support systems (OSSs) 104, a network 106, a cell site maintenance tracking system 108, and a cell site monitoring system 110. The network 106 comprises one or more public networks, one or more private networks, or a combination thereof. The RAN 102 comprises a plurality of cell sites 118 that may provide cellular wireless links to user equipment (UEs) 119.

The cell site 118 may comprise a plurality of different cells. While the cell site 118 is illustrated in FIG. 1 as comprising three different cells, the cell site 118 may comprise a single cell, two cells, four cells, or some greater number of cells less than twenty cells. A cell of the cell site 118 may provide a wireless cellular communication link to a UE 119 according to a 6G, 5G, a long-term evolution, a code division multiple access (CDMA), or a global system for mobile communication (GSM) telecommunication protocol. Different cells of the cell site 118 may be configured to support different cellular protocols. For example, a first cell of the cell site 118 may be configured to support the 5G protocol, a second cell of the cell site 118 may be configured to support the 5G protocol, while a third cell of the cell site 118 may be configured to support the LTE protocol. Each different cell of the cell site 118 may be configured to communication with UEs 119 using different, non-overlapping radio frequency bands.

It is understood that the RAN 102 may comprise tens of thousands or even hundreds of thousands of cell sites 118. It is understood that the RAN 102 and cell sites 118 may provide wireless communication links to tens of millions of UEs 119. The UEs 119 may comprise a mix of different electronic equipment, including mobile phones, smart phones, wearable computers, headset computers, laptop computers, notebook computers, tablet computers, and Internet of Things (IoT) devices. The RAN 102 may be considered to be a part of the network 106 but is shown separately in FIG. 1 to promote improved understanding of the disclosure. A particular embodiment of a communication network is described further below with reference to FIG. 5A and FIG. 5B.

The OSSs 104 are applications that execute on one or more computer systems. Each OSS 104 is in communication with one or more cell sites 118. Each OSS 104 receives information about the status of equipment at the one or more cells associated with that OSS 104. Each OSS 104 may be provided by a cell site equipment vendor to monitor and control cell sites provided by that vendor. Cell site equipment vendors may provide different OSSs 104 for different cellular equipment technologies, for example a first OSS for a long-term evolution (LTE) cell technology and a second different OSS for a 5G cell technology. Cell status information for different technologies may be different because the architectures of different generations of cellular communication technology often are different. The OSSs 104 may provide cell status information to authorized applications and/or computer systems that access an application programming interface (API) of the OSS 104. The OSSs 104 may provide information about one or more cells being in a low-power operation mode. For example, when a cell site 118 is experiencing low user traffic (e.g., few UEs 119 are engaged in communication sessions via the cell site 118), some cells of the cell site 118 may go into a low-power mode of operation temporarily to reduce the energy consumption of the cell site 118. This reduction of energy consumption may reduce the cost of operating the cell site 118 and further may mitigate impacts on the environment by reducing net $CO2$ emissions (e.g., reduced consumption of electrical power at the cell site 118 may result in reduced $CO2$ emissions at an associated electrical power generation facility that sources electric power to the cell site 118).

The cell site maintenance tracking system 108 may comprise an application executing on a computer system and may be used by employees of a wireless communication service provider to schedule and coordinate maintenance activities performed on cell sites 118. The cell site maintenance tracking system 108 may indicate, for example, when a cell site 118 is in maintenance mode. If a cell site 118 is in maintenance, it may not be appropriate to respond to alarms generated by the cell site 118 as if they indicate actual equipment failures.

The cell site monitoring system 110 may be used to assign incident reports to engineers to resolve and to propagate indications up to technicians for monitoring and taking actions. The cell site monitoring system 110 may comprise a cell site monitoring application that executes on a computer system. The cell site monitoring application processes and analyzes cell status information and makes this information available for use by technicians and other automation systems.

The system 100 further comprises a network operation center (NOC) dashboard 116. In an embodiment, the NOC dashboard 116 is an application that executes on a computer system and provides a display screen for one or more NOC technicians to monitor and perform operations to maintain the RAN 102 and/or the cell sites 118. In an embodiment, the cell site maintenance tracking system, the cell site monitoring system, and/or the NOC dashboard 116 may be executed on a single computer system or on a plurality of different computer systems.

Figure 2:
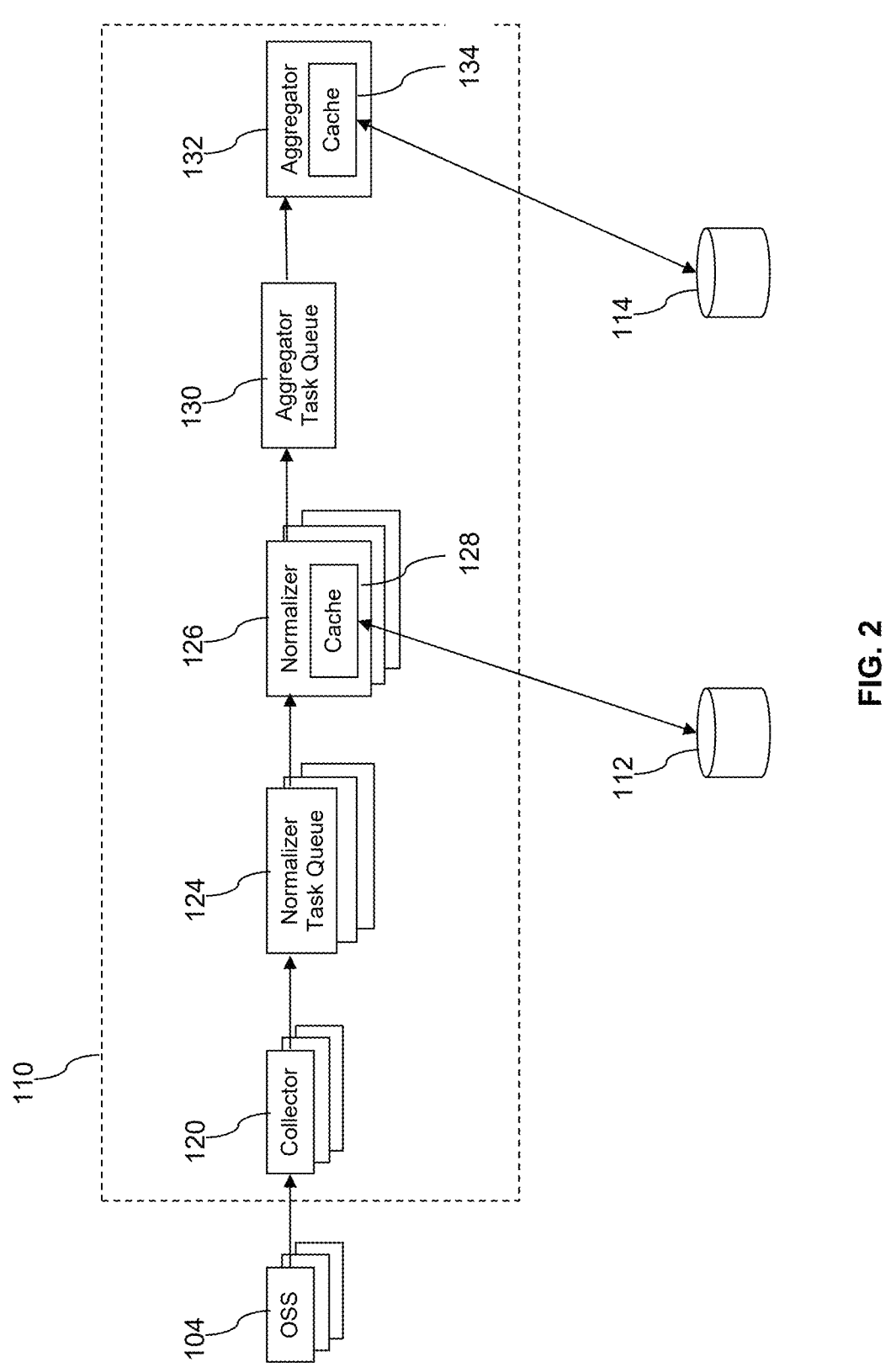
FIG. 2 is a block diagram of a cell site monitor according to an embodiment of the disclosure.

Turning now to FIG. 2, further details of a portion of the cell site monitoring system 110 are described. In an embodiment, the cell site monitoring system 110 comprises a plurality of collector applications 120, a plurality of normalizer applications 126, and an aggregator application 132. The collector applications 120, the normalizer applications 126, and the aggregator application 132 execute on one or more computer systems. Computer systems are discussed further hereinafter with reference to FIG. 6.

In an embodiment, the collector applications 120 retrieve cell status information from the OSSs 104, process the cell status information, and place processed cell status information on a plurality of normalizer task queues 124. In an embodiment, the normalizer applications 126 retrieve processed cell status information from the normalizer task queues 124, process the cell status information, and place normalized cell status information on an aggregator task queue 130. In an embodiment, the aggregator application 132 retrieves normalized cell status information from the aggregator task queue 130 and processes the normalized cell status information.

In an embodiment, the cell site monitoring system 110 comprises four different collector applications 120, a first collector application that collects cell status information for LTE cell equipment provided by a first cell equipment vendor, a second collector application that collects cell status information for LTE cell equipment provided by a second cell equipment vendor, a third collector application that collects cell status information for 5G cell equipment provided by the first cell equipment vendor, and a fourth collector application that collects cell status information for 5G cell equipment provided by the second cell equipment vendor. Each different collector application 120 is associated with a different unique combination of cell equipment technology and cell equipment vendor. In an embodiment, there may be additional cell equipment technologies and/or additional cell equipment vendors, and in this case there would be more than four collector applications 120. In an embodiment, two or more instances of the same collector application 120 may execute in parallel on one or more computer systems.

The collector applications 120 receive cell status information from the OSSs 104 and formats that information into a parseable format. For example, each collector application 120 may be configured to periodically poll one or more of the OSSs 104. In an embodiment, the collector applications 120 are configured to poll one or more OSSs 104 every minute, every two minutes, every three minutes, every four minutes, every five minutes, every six minutes, every seven minutes, every ten minutes, every twelve minutes, every fifteen minutes, every twenty minutes, every twenty-five minutes, every thirty minutes, or some other periodic interval of time. In an embodiment, the periodic interval at which the collector applications 120 poll the OSSs 104 is data driven: for example, the collector applications 120 on instantiation may read a configuration file that defines the periodic interval and other operational parameters of the collector applications 120. Each collector application 120 places the parseable cell status information on a task queue 124 associated with the same unique combination of cell technology and cell equipment vendor that is associated with the given collector application 120. In an embodiment, the task queues 124 are different Kafka topics.

Each of the normalizer applications 126 is associated with a unique combination of cell technology and cell equipment vendor. Each normalizer application 126 retrieves parseable cell status information from a normalizer task queue 124 that is associated with the same unique combination of cell technology and cell equipment vendor as the given normalizer application 126 is associated with. In an embodiment, the normalizer applications 126 subscribe to the appropriate normalizer task queue 124 to be triggered when the normalizer task queue 124 is updated. In this way, the normalizer applications 126 may be said to be event driven. In an embodiment, the normalizer applications 126 subscribe to a Kafka topic associated with the unique combination of cell technology and cell equipment vendor that the normalizer application 126 is associated with.

Each normalizer application 126 transforms parseable cell status information that is in a technology and vendor specific format into a uniform, normalized format and/or data structure. Additionally, the normalizer applications 126 read information from the cell site maintenance tracking system 108 to determine whether a given cell is in a special mode that bears upon its analysis of the status of the given cell. Cells may be in a maintenance mode, in a decommissioned mode, or in a new status not yet placed in service. Such cells may be associated with cell information suggesting they are down (e.g., not in working operation), but given their being in a non-standard mode the normalizer application 126 may not mark them as down.

The normalizer applications 126 each comprise a normalizer cache 128 in which they store normalized cell status information. In an embodiment, the normalizer cache 128 is implemented in a memory area allocated to the subject normalizer application 126 on the computer system on which the normalizer application 126 executes. In an embodiment, the normalizer cache 128 may be implemented in a transitory portion of memory or in a non-transitory portion of memory of the computer system on which the normalizer application 126 executes.

When there is a change of cell status information, the normalizer application 126 writes the changed information to the first data store 112, for example in the form of a delta. In this way, the writing of cell status information to the first data store 112 is reduced substantially, because change of cell status information is likely to be infrequent. Periodically and/or on the event of triggering actions occurring, the normalizer applications 126 may rebuild their normalizer cache 128 from the information stored in the first data store 112, whereby to keep the normalizer cache 128 and the first data store 112 synchronized. Other systems and/or applications in the system 100, for example the NOC dashboard 116, may read cell status information from the first data store 112. The use of the normalizer cache 128 to update the first data store 112 by the normalizer applications 126 assures look-ups in the first data store 112 by other systems are very fast and up-to-date with the information percolating up from the OSSs 104. For example, the first data store 112 will be rarely written to by the normalizer caches 128 of the normalizers 126 because only deltas are written to the first data store 112 and deltas will be relatively rare, and hence other systems attempting to read from the first data store 112 will relatively rarely have to wait for a normalizer cache 128 to release access to the first data store 112 to be able to read from the first data store 112.

The normalizer applications 126 also write normalized cell status information to the aggregator task queue 130. In an embodiment, the aggregator task queue 130 is embodied as a Kafka topic that the aggregator application 132 subscribes to. The aggregator application retrieves cell status information from the aggregator task queue 130. The aggregator application 132 retrieves normalized cell status information from the aggregator task queue 130 and determines a cell site availability for each of the cell sites 118 based on the normalized cell status information. An availability of a cell site 118 is a numerical indication of what portion of the cell site 118 is available for handling user traffic. In an embodiment, cell sites may have five or more different cells associated with the same cell site, cell sites may have ten or more different cells associated with the same cell site, cell sites may have thirty or more different cells associated with the same cell site, cell sites may have fifty or more different cells associated with the same cell site and less than two hundred different cells associated with the same cell site. The cells may be of different cell technologies. Different cells at the same cell site 118 may be associated with the same cell technology but be configured to support different frequency bands for the given cell technology. In an embodiment, the aggregator application 132 determines cell site availability based on the number of cells at the given cell site that are deemed in-service divided by the number of cells at the cell site. It is understood that some of the cells deemed in-service may not in fact be communicating with UEs 119. For example, a cell that is in a maintenance mode and not communicating with UEs 119 may not be deemed out-of-service and may instead be counted as in-service for purposes of calculating cell site availability. For example, a cell that is in a low-power operation mode (e.g., during low user communication traffic hours) and not communicating with UEs 119 may not be deemed out-of-service and may instead be counted as in-service for purposes of calculating cell site availability. A cell that is decommissioned may not be counted among the numbers of cells at the cell site and hence may not decrease the calculated value of cell site availability for the given cell.

The aggregator application 132 comprises an aggregator cache 134 in which it stores cell site availability information. In an embodiment, the aggregator cache 134 is implemented in a memory area allocated to the aggregator application 132. In an embodiment, the aggregator cache 134 may be implemented in a transitory portion of memory or in a non-transitory port of memory of the computer system on which the aggregator application 132 executes. The aggregator application 132 writes cell site availability information into an aggregator cache 134. When the cell site availability information written to the aggregator cache 134 changes, the aggregator application 132 writes the cell site availability information to the second data store 114, for example in the form of a delta.

The use of the aggregator cache 134 to update the second data store 114 by the aggregator application 132 assures look-ups in the second data store 114 by other systems are very fast and up-to-date with the information percolating up from the OSSs 104. For example, the second data store 114 will be rarely written to by the aggregator cache 134 of the aggregator application 132 because only deltas are written to the second data store 114 and deltas will be relatively rare, and hence other systems attempting to read from the second data store 114 will relatively rarely have to wait for the aggregator cache 134 to release access to the second data store 114 to be able to read from the second data store 114.

The NOC dashboard 116 and other applications of a network management system (NMS) may read cell status information from the first data store 112 and may read cell site availability information from the second data store 114. The NOC dashboard 116 may present the cell information and cell site availability information in a display screen. NOC personnel may respond to the presented cell information and cell site availability information presented on their display screens by taking actions to restore cell sites that exhibit decreased availability and/or to restore cells that are underperforming. Other applications that monitor RAN conditions may respond to the cell information and cell site availability information by planning deployments of additional cell sites to serve shifting subscriber locations.

Turning now to FIG. 3, a method 200 is described. In an embodiment, the method 200 is a method of monitoring cell site status. At block 202, the method 200 comprises storing cell status information by a collector application executing on a computer system in a normalizer queue that is associated with a unique combination of cell vendor and cell technology, wherein the cell status information is formatted based on both the cell vendor and on the cell technology. In an embodiment, the cell status information comprises an indication that at least some cells are in a low-power operation mode (e.g., power saving mode). In an embodiment, the cell status information relates to cells at cell sites of a radio access network (RAN) and the cells are configured to provide wireless communication links to user equipment (UE) according to a 6G, a 5G, a long-term evolution (LTE), a code division multiple access (CDMA), or a global system for mobile communications (GSM) telecommunication protocol. In an embodiment, the collector application obtains cell status information from an operational support system (OSS) periodically.

At block 204, the method 200 comprises processing cell status information retrieved from the normalizer queue by a normalizer application executing on the computer system to generate normalized cell status information. At block 206, the method 200 comprises storing normalized cell status information by the normalizer application in an aggregator queue. In an embodiment, the method 200 may further comprise reading information by the normalizer application from a cell site maintenance tracking system; and determining by the normalizer application special modes of at least some cell sites, wherein generating normalized cell status information is based, at least in part, on the special modes of at least some cell sites. In an embodiment, the special modes comprise a maintenance mode and a decommissioned mode.

At block 208, the method 200 comprises processing normalized cell status information retrieved from the aggregator queue by an aggregator application executing on the computer system to generate a cell site availability for a cell site associated with a plurality of cells. At block 210, the method 200 comprises storing the cell site availability in a data store.

At block 212, the method 200 comprises retrieving the cell site availability from the data store by a network operation center (NOC) application executing on the computer system. At block 214, the method 200 comprises presenting cell site availability by the NOC application on a display screen. In an embodiment, the method 200 may further comprise retrieving normalized cell status information by the NOC application; and presenting cell status information by the NOC application on the display screen.

Turning now to FIG. 4, a method 230 is described. At block 232, the method 230 comprises periodically retrieving cell site information from operational support systems (OSSs) by an application executing on a computer system, where the cell site information is associated with cell sites sourced by different equipment vendors and associated with different cellular technologies. The cell site information may be cell status information related to individual cells located at a cell site. A cell site may comprise a plurality of cells of the same or different cellular technologies. In an embodiment, the cell sites provide wireless communication links to user equipment (UE) according to a 6G, a 5G, a long-term evolution (LTE), a code division multiple access (CDMA), or a global system for mobile communications (GSM) telecommunication protocol. In an embodiment, a periodic interval of periodically retrieving cell site information from OSSs by the application is configurable. In an embodiment, the cell site information retrieved by the application from the OSSs comprises information indicating at least some of the cells of some of the cell sites are in a low-power operation mode.

At block 234, the method 230 comprises converting the cell site information received from the OSSs by the application into a uniform format. At block 236, the method 230 comprises retrieving maintenance information about cell sites by the application. In an embodiment, the maintenance information about cell sites comprises an indication that a cell site is in a maintenance mode or in a decommissioned mode. At block 238, the method 230 comprises, based on the maintenance information and based on the cell site information in uniform format, determining status of cells by the application.

At block 240, the method 230 comprises, based on the status of cells and based on an inventory of cells disposed at different cell sites, determining a cell site availability for the cell sites by the application. In an embodiment, the cell site availability of a cell site is determined based on the number of cells at the cell site that are deemed in-service divided by the number of cells at the cell site. At block 242, the method 230 comprises providing the status of cells and the cell site availability by the application to a network operation center (NOC) application executing on the computer system.

Figure 5A:
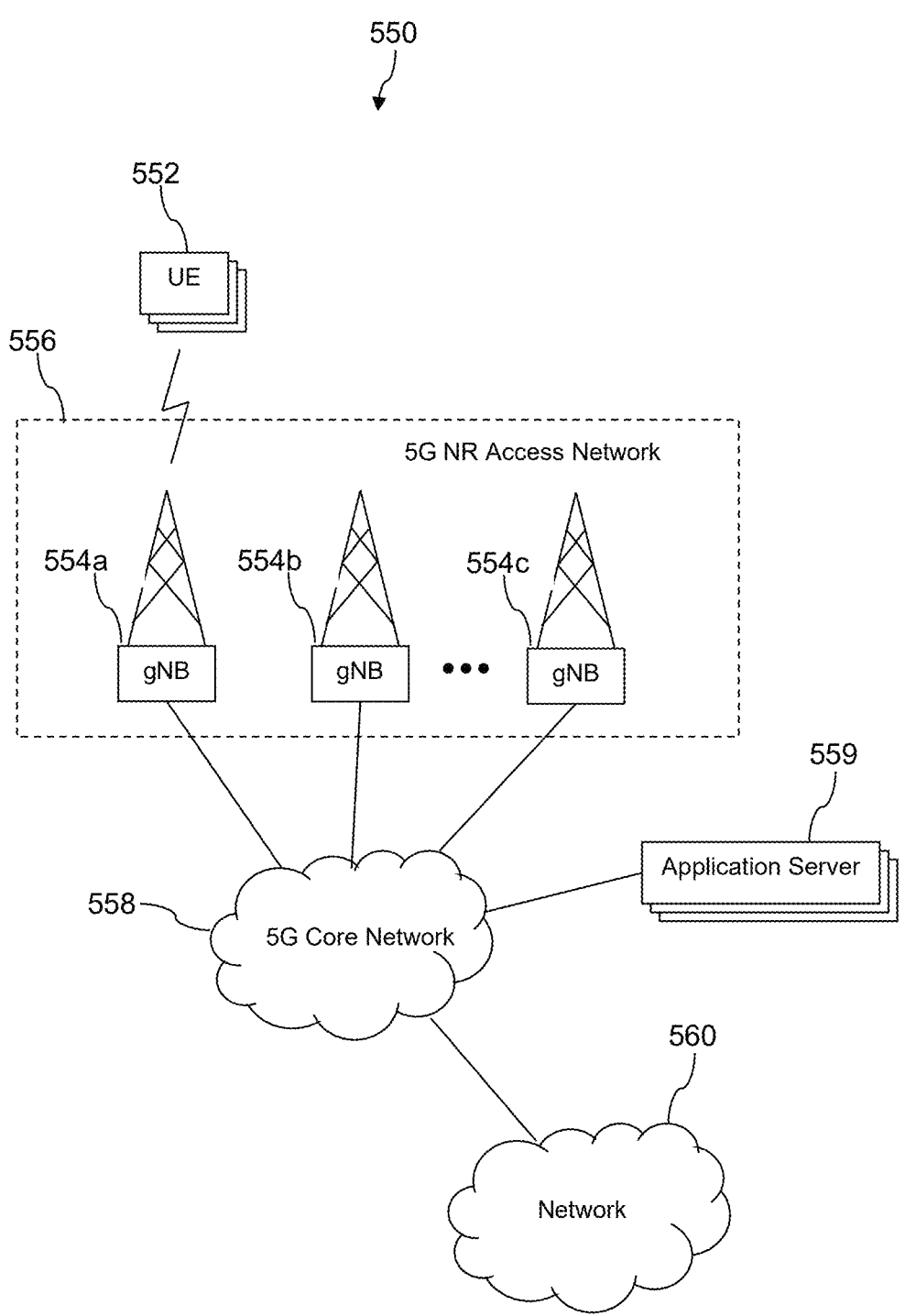
FIG. 5A and FIG. 5B is a block diagram of a network according to an embodiment of the disclosure.

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
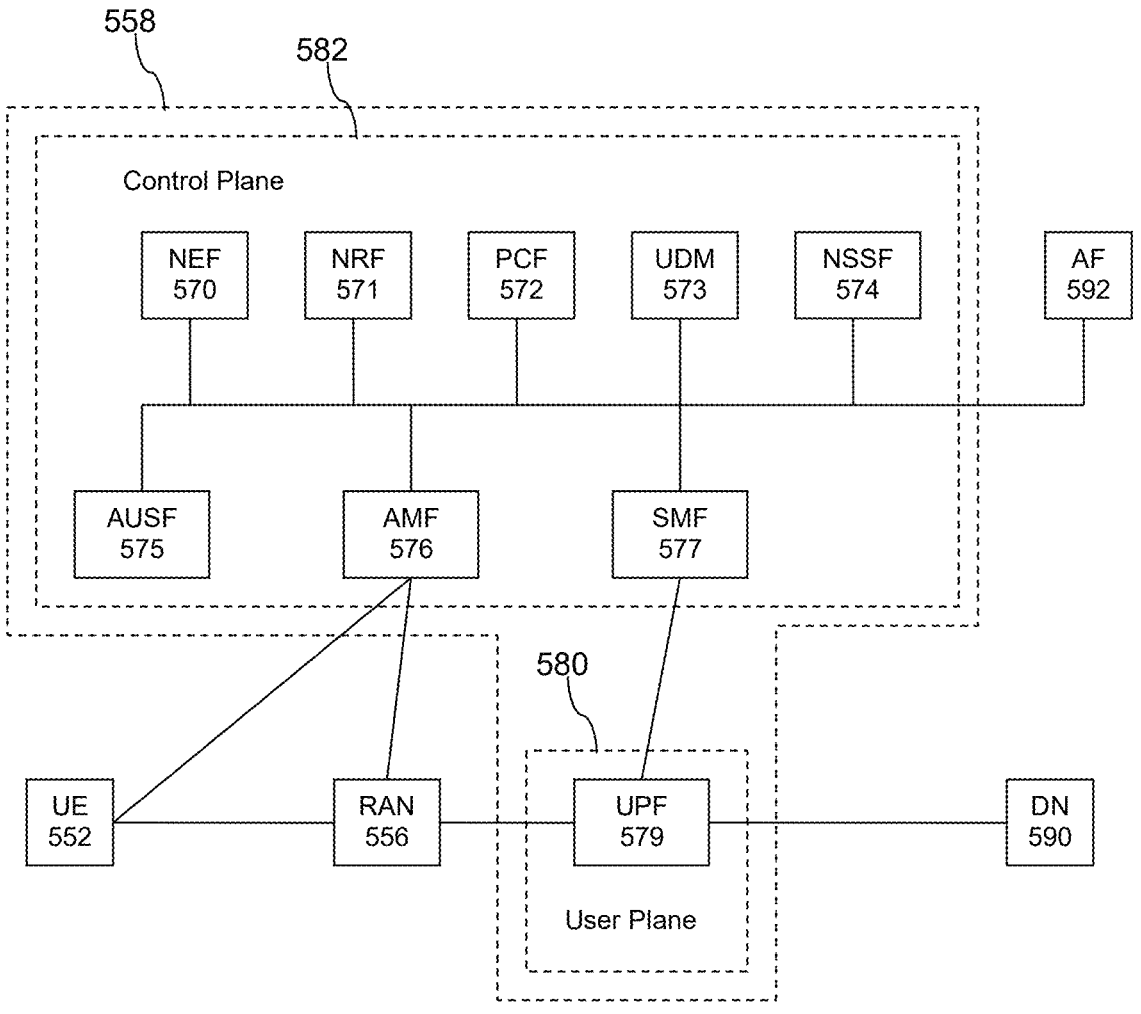

Turning now to FIG. 5B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
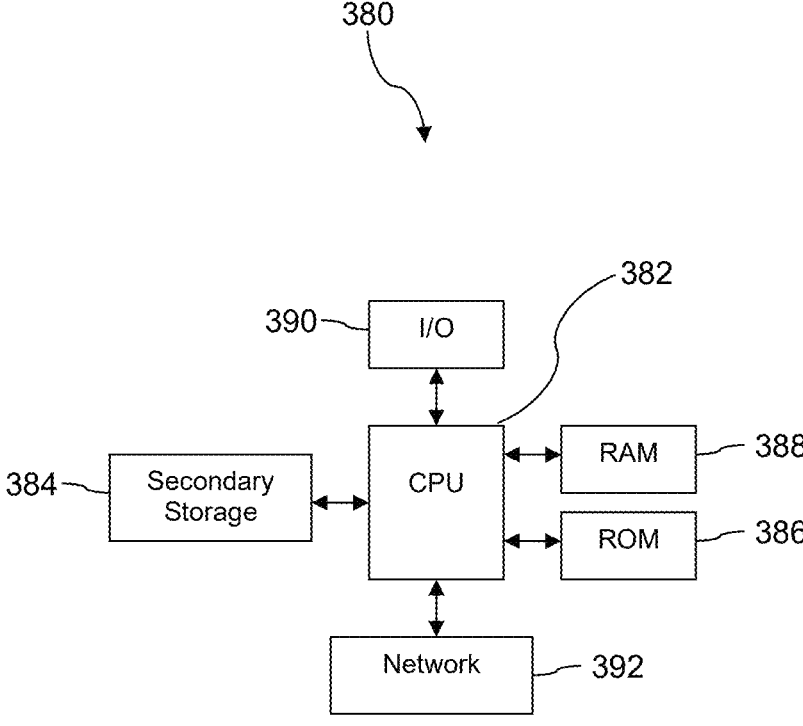
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cell site status monitoring system, comprising:
an at least one processor;
a non-transitory memory;
a plurality of cell status collector applications stored in the non-transitory memory, wherein each cell status collector application, when executed by the at least one processor:
obtains cell status information about cells associated with a unique combination of vendor and wireless technology, and
stores the obtained cell status information on a normalizer task queue associated with the unique combination of vendor and wireless technology that is associated to the cell status collector application;
a plurality of normalizer applications stored in the non-transitory memory, wherein each normalizer application is associated with a unique combination of vendor and wireless technology, and wherein each normalizer application, when executed by the at least one processor:
retrieves cell status information from the normalizer task queue associated with the same unique combination of vendor and wireless technology that the normalizer application is associated with,
based on the retrieved cell status information, generates normalized cell status information in a normalized format,
stores the normalized cell status information in a normalizer cache,
stores changed normalized cell status information in a first data store in the non-transitory memory, and
stores normalized cell status information on an aggregator task queue; and
an aggregator application stored in the non-transitory memory, wherein the aggregator application, when executed by the at least one processor:
retrieves normalized cell status information from the aggregator task queue,
processes the normalized cell status information to determine a cell site availability for each of a plurality of cell sites, wherein at least some of the plurality of cell sites comprise cells associated with different vendors and different technologies,
stores the cell site availability for each of the plurality of cell sites in an aggregation cache in the non-transitory memory, and
stores changed cell site availability in a second data store in the non-transitory memory.

2. The system of claim 1, further comprising a network operation center (NOC) application stored in the non-transitory memory that, when executed by the at least one processor,
reads normalized cell status information from the first data store,
reads cell site availability from the second data store; and
presents cell status and cell site status information on a display, whereby NOC personnel are enabled to operate and maintain a radio access network (RAN) comprising a plurality of cell sites.

3. The system of claim 1, where the cell status information relates to cells at cell sites of a radio access network (RAN) and the cells provide wireless communication links to user equipment (UE) according to a 6G, a 5G, a long-term evolution (LTE), a code division multiple access (CDMA), or a global system for mobile communications (GSM) telecommunication protocol.

4. The system of claim 1, wherein the unique combinations of wireless technology comprise a first vendor of cell equipment and a 5G wireless technology, the first vendor of cell equipment and a long-term evolution (LTE) wireless technology, a second vendor of cell equipment and the 5G wireless technology, and the second vendor of cell equipment and the LTE wireless technology.

5. The system of claim 1, wherein the cell site availability of a cell site is determined based on the number of cells at the cell site that are deemed in-service divided by the number of cells at the cell site.

6. The system of claim 1, wherein the normalizer applications are event driven.

7. The system of claim 1, wherein the cell status collector applications obtain cell status information about cells periodically every five minutes.

8. A method of monitoring cell site status, comprising:

storing cell status information by a collector application executing on a computer system in a normalizer queue that is associated with a unique combination of cell vendor and cell technology, wherein the cell status information is formatted based on both the cell vendor and on the cell technology;

reading information by a normalizer application executing on the computer system from a cell site maintenance tracking system;

determining by the normalizer application special modes of at least some cell sites;

processing cell status information retrieved from the normalizer queue by the normalizer application to generate normalized cell status information based at least in part on the special modes of at least some cell sites;

storing normalized cell status information by the normalizer application in an aggregator queue;

processing normalized cell status information retrieved from the aggregator queue by an aggregator application executing on the computer system to generate a cell site availability for a cell site associated with plurality of cells;

storing the cell site availability in a data store;

retrieving the cell site availability from the data store by a network operation center (NOC) application executing on the computer system; and presenting cell site availability by the NOC application on a display screen.

9. The method of claim 8, further comprising:

retrieving normalized cell status information by the NOC application; and presenting cell status information by the NOC application on the display screen.

10. The method of claim 8, wherein the collector application obtains cell status information about cells periodically every five minutes.

11. The method of claim 8, wherein the special modes comprise a maintenance mode and a decommissioned mode.

12. The method of claim 8, wherein the cell status information comprises an indication that at least some cells are in a low-power operation mode.

13. The method of claim 8, where the cell status information relates to cells at cell sites of a radio access network (RAN) and the cells provide wireless communication links to user equipment (UE) according to a 6G, a 5G, a long-term evolution (LTE), a code division multiple access (CDMA), or a global system for mobile communications (GSM) telecommunication protocol.

14. The method of claim 8, wherein the collector application obtains cell status information from an operational support system (OSS) periodically.

15. A method, comprising:

periodically retrieving cell site information from operational support systems (OSSs) by an application executing on a computer system, where the cell site information is associated with cell sites sourced by different equipment vendors and associated with different cellular technologies;

converting the cell site information received from the OSSs by the application into a uniform format;

retrieving maintenance information about cell sites by the application;

based on the maintenance information and based on the cell site information in uniform format, determining status of cells by the application;

based on the status of cells and based on an inventory of cells disposed at different cell sites, determining a cell site availability for the cell sites by the application; and providing the status of cells and the cell site availability by the application to a network operation center (NOC) application executing on the computer system.

16. The method of claim 15, wherein a periodic interval of periodically retrieving cell site information from OSSs by the application is configurable.

17. The method of claim 15, wherein the maintenance information about cell sites comprises an indication that a cell site is in a maintenance mode or in a decommissioned mode.

18. The method of claim 15, wherein the cell site availability of a cell site is determined based on the number of cells at the cell site that are deemed in-service divided by the number of cells at the cell site.

19. The method of claim 15, wherein the cell sites provide wireless communication links to user equipment (UE) according to a 6G, a 5G, a long-term evolution (LTE), a code division multiple access (CDMA), or a global system for mobile communications (GSM) telecommunication protocol.

20. The method of claim 15, wherein the cell site information retrieved by the application from the OSSs comprises information indicating at least some of the cells of some of the cell sites are in a low-power operation mode.

* * * * *